(12) United States Patent
Wang

(10) Patent No.: US 8,429,288 B2
(45) Date of Patent: Apr. 23, 2013

(54) MASSIVE TERMINALS ACCESS OF A STREAMING MEDIA SERVER INCLUDING SETTING MAXIMUM COUNT OF FILE HANDLES ALLOWED TO BE OPENED

(75) Inventor: Jinggui Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 72 days.

(21) Appl. No.: 13/142,069

(22) PCT Filed: Sep. 3, 2009

(86) PCT No.: PCT/CN2009/073729
§ 371 (c)(1),
(2), (4) Date: Jun. 24, 2011

(87) PCT Pub. No.: WO2010/072081
PCT Pub. Date: Jul. 1, 2010

(65) Prior Publication Data
US 2011/0296049 A1 Dec. 1, 2011

(30) Foreign Application Priority Data
Dec. 25, 2008 (CN) .......................... 2008 1 0246535

(51) Int. Cl.
*G06F 15/16* (2006.01)
(52) U.S. Cl.
USPC ........................................................ 709/231
(58) Field of Classification Search .................. 725/115; 709/213, 219, 231
See application file for complete search history.

(56) References Cited

U.S. PATENT DOCUMENTS

| 5,630,757 | A | * | 5/1997 | Gagin et al. | 463/43 |
| 5,737,330 | A | * | 4/1998 | Fulthorp et al. | 370/346 |
| 5,879,236 | A | * | 3/1999 | Lambright | 463/42 |
| 2003/0174648 | A1 | * | 9/2003 | Wang et al. | 370/235 |
| 2006/0225089 | A1 | * | 10/2006 | Ikeda | 725/25 |
| 2007/0083667 | A1 | * | 4/2007 | Cooper | 709/231 |
| 2007/0297609 | A1 | * | 12/2007 | Adams et al. | 380/270 |

FOREIGN PATENT DOCUMENTS

| CN | 1561043 A | 1/2005 |
| CN | 101159747 A | 4/2008 |
| CN | 101448006 A | 6/2009 |

OTHER PUBLICATIONS

Ciu, Bin et al., Realization of EPOLL-based Linux Online Gamer Server, 1008-0570(2006)07-3-0064-3, 2006, Vo 7-3, pp. 64-66.

* cited by examiner

*Primary Examiner* — Lance L Barry
(74) *Attorney, Agent, or Firm* — Brooks Kushman P.C.

(57) ABSTRACT

The present invention relates to IPTV technical field, and discloses a method and system for implementing access of a large number of terminals to a streaming media server to solve the technical problems of the streaming media server having low processing efficiency and not supporting the access of a large number of terminals by TCP short connections when there are a large number of terminals accessing to the streaming media server in the prior art. The present invention uses EPOLL/POLL event polling interface to poll the events in the established link, thereby improving the capability of the system to accept the access of a large number of terminals. A socket file descriptor is used as an index entry of the polling list in the present invention such that the link retrieval efficiency is improved when there are a large number of terminals accessing.

14 Claims, 2 Drawing Sheets

MASSIVE TERMINALS ACCESS OF A STREAMING MEDIA SERVER INCLUDING SETTING MAXIMUM COUNT OF FILE HANDLES ALLOWED TO BE OPENED

CROSS-REFERENCE TO RELATED APPLICATIONS

This application is a U.S. national phase of PCT Application No. PCT/CN2009/073729 filed Sep. 3, 2009 which claims priority to Chinese Application No. 200810246535.1 filed Dec. 25, 2008, the disclosures of which are incorporated in their entirety by reference herein.

TECHNICAL FIELD

The present invention relates to the field of Internet Protocol Television (IPTV) technology, and more especially, to a method and system for implementing access of a large number of terminals (set top boxes, STBs) to a streaming media server.

BACKGROUND OF THE RELATED ART

In streaming media servers, the criteria for evaluating and measuring the service performance are mainly the maximum number of concurrent video streams, the quality of each video stream, bandwidth fluctuation, the average used bandwidth, packet loss rate, and the average response time. Besides the above criteria, there are also the following criteria:

Connections: the number of TCP connections that are established by using three-time handshake of TCP.

Concurrent connections: a plurality of TCP connections established between the STB and the server (streaming media server).

Throughput: the speed of sending or receiving data by the tested device.

Video bitrate: the speed of evaluating the content of video stream information.

Wherein, the maximum number of concurrent video streams refers to the maximum number of online users that the streaming media server is able to support and process at the same time, and it requires each user can watch the whole video program normally in the condition of guaranteeing the video quality.

To date, reliable connection-oriented TCP/IP mode is generally used to implement the system communication between two devices in the IPTV system. The message interaction between the IPTV streaming media device and the terminal can be implemented in the TCP/IP by transmission control protocols such as the real time streaming protocol (RTSP), etc. and the application layer module completes other service processes such as video on demand. However, since the management capability and processing efficiency of the streaming media server are not so high when there are a lot of terminals accessing to the streaming media server in the prior art, the streaming media server cannot support the TCP short connections of a large number of terminals reliably in general conditions.

SUMMARY OF THE INVENTION

Due to the above reasons, one of the main purposes of the present invention is to provide a streaming media server as well as a system for implementing access of a large number of terminals to a streaming media server to solve the technical problem that the IPTV streaming media server does not support the TCP short connections for a large number of terminals to reliably access to the streaming media server. In order to achieve the above purpose, the technical scheme according to an embodiment of the present invention is implemented as follows:

A streaming media server comprises:

a link initialization module: which is used to implement the initialization operation;

a task polling module: which is used to intercept and poll the events in the link;

a transmission processing module: which is used to process the message data sent from the upper layer application and notify the task polling module to send the processed message data;

a receipt processing module: which is used to read the received message data from the task polling module, and process it and send the processed message data to the upper layer application;

said task polling module is responsible for establishing and polling the link, and when the terminal sends a message to the streaming media server, the task polling module receives the message data sent from the link and notifies said receipt processing module to process the message data; when the streaming media server needs to send a message to the terminal, the transmission processing module organizes the message data and notifies the task polling module which sends the message data.

Furthermore, said task polling module uses an EPOLL/POLL event polling interface to poll the events in the established link, so as to improve the capability of the system to accept the access of a large number of terminals.

Furthermore, said task polling module comprises a polling list which is used to save the links, and said polling list uses the socket file descriptor as an index entry, since the socket file descriptor is a variable of integer type, the efficiency of searching and positioning in task polling is higher than that of other types.

Furthermore, said system also comprises a self-loop activation module that is used to wake and activate the task polling.

The present invention also provides a system for implementing access of a large number of terminals to a streaming media server, and said system comprises said streaming media server.

Another purpose of the present invention is to provide a method for implementing access of a large number of terminals to a streaming media server, and in order to achieve the above purpose, the technical scheme according to an embodiment of the present invention is implemented as follows:

A method for implementing access of a large number of terminals to a streaming media server comprises:

The first step: after the streaming media server receives a link establishment request from the terminal, the polling task responds to the request and processes it, and adds the newly-established link into a polling pool.

After initialization of system, the task polling module starts up the polling task, and according to the link establishment request sent from the terminal, the streaming media server responds to the request by the polling task, and processes the generated intercepting event, and establishes a connection with the terminal, and adds the newly established connection into the polling pool. After the polling task starts up, the polling pool is queried at an interval of ten milliseconds, when detecting the to-be-processed event in the polling pool is an intercepting event, the processing procedures are:

Step 101: find an idle link to save a new link;

Step 102: set a socket file descriptor used in read operation for the new link;

Step 103: set a readable event for the new link

Step 104: add the new link into the polling pool.

Furthermore, in an embodiment of the present invention, the polling pool uses the polling list to save online (active state) links, and in the system, the socket file descriptor, as a description symbol of the device, has a certain value range and space, and it can be used as the index entry to uniquely determine a certain link. An embodiment of the present invention uses the socket file descriptor of the newly established link as the index entry in the polling list, which improves the searching efficiency.

Furthermore, considering the connections of a large number of terminals to be supported, when the streaming media server device begins to start up a communication management task, that is, during the initialization, an embodiment of the present invention uses the dynamic link library interface offered by the operating system to set the maximum socket file descriptor or called device handle allowed to be opened in this communication task. The socket file descriptor described here is one of file handles. Only the maximum socket file descriptor is set, so that the communication task of system can be opened and more user connections can be established. This part of work is mainly completed by the link initialization module in an embodiment of the present invention.

The second step: the polling task polls and detects the polling pool, and when there is message data sent from the terminal, the polling task receives said message data and sets a readable event, and the receipt processing module responds to said readable event, and reads and analyzes the message sent from the terminal, and then forwards the message to the upper layer application (RTSP protocol layer).

The third step: the transmission processing module packages the message data sent to the terminal by the upper layer application to form a complete message and writes the message into a sending queue, and also sets a writable event, and after the task polling module detects that there is a writable event, the to-be-sent message data is acquired from the sending queue and sent to the terminal.

The fourth step: in order to check whether the message channel between the terminal and the upper layer application (RTSP protocol layer) of the streaming media server is in activated state or not, the terminal sends a heartbeat keep-alive message to the upper layer application of the server side periodically, and the server side performs timing detection, and the task polling module is responsible for transparently forwarding the heartbeat keep-alive message, and the purpose of keeping the heartbeat alive is to solve the problem of the abnormal exit or infinite wait because one party in the communication link is closed abnormally and the other party does not receive the heartbeat keep-alive message sent from this party in a certain period of time, thus it can guarantee that the other party in the communication can discover the abnormality and release link resource in time, and the task polling module does not relate to specific service analysis.

The fifth step: after the service process ends, the terminal actively initiates a disconnection request. The task polling module in an embodiment of the present invention recycles and releases the corresponding item of the polling list in the polling pool, and clears the sending and receiving message queues related to this connection.

Furthermore, in order to prevent the abnormality, such as the polling task not responding or hanging up, from occurring, an embodiment of the present invention also provides a self-healing activation mechanism which is implemented by the self-loop activation module. The self-loop activation module creates an automatic activation socket in the streaming media server, and when there is no event happening in the polling pool, an activation message is sent through the internal loopback address to trigger the polling task to perform the message polling function.

The technical scheme according to an embodiment of the present invention uses the improved event polling interface to guarantee the maximum number of concurrent video streams of the streaming media server and to support the access of a large number of terminals by TCP short connections at the same time. Since link searching method of directly indexing is applied when creating a link, the efficiency of communication processing can be significantly increased. The technical scheme can be flexibly applied into environments, such as the streaming media server communication system in the IPTV, in which there are a lot of STBs accessing.

PREFERRED EMBODIMENTS OF THE PRESENT INVENTION

Figure 1:
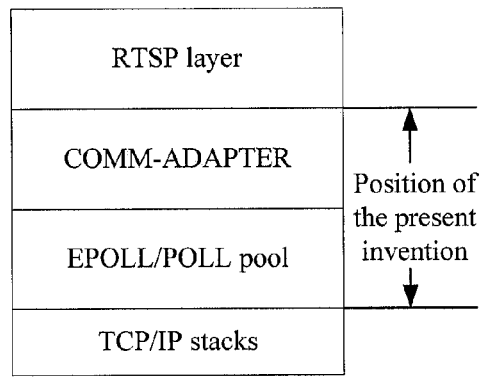
FIG. 1 is a position diagram of an embodiment of the present invention in the protocol hierarchical structure.

The present invention has great advantages in responding to the access of a large number of STBs and in concurrently processing several users. In order to make the purpose, technical scheme and the advantages of the present invention clearer, the present invention will be described in further detail below in combination with the accompanying figures, which comprises the following parts:

FIG. 1 is a system hierarchical diagram of the position in which an embodiment of the present invention is located, and the embodiment of the present invention is positioned between the RTSP and the TCP/IP protocol stack, and it mainly relates to the polling pool and the communication adaptation part in which the streaming media server is responsible for communication tasks. The polling pool is used to save all kinds of message processing events to be processed by the task polling module in the communication adaptation part.

Figure 2:
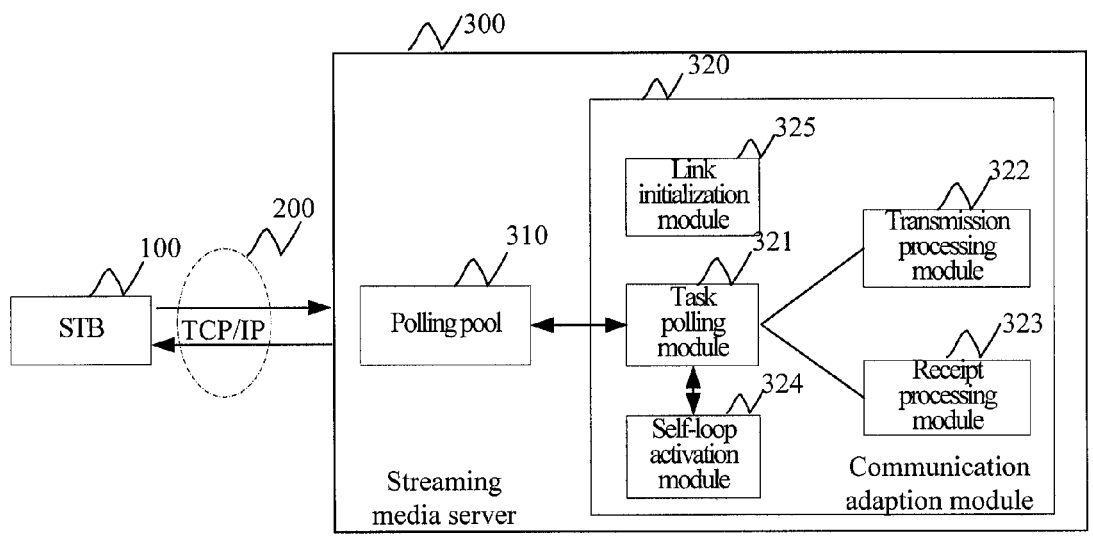
FIG. 2 is a schematic diagram of the structure of the system for implementing the access of a large number of terminals to the streaming media server in accordance with an embodiment of the present invention.

FIG. 2 is a schematic diagram of the structure of the system for implementing access of a large number of terminals to the streaming media server in accordance with an embodiment of the present invention, mainly comprising a terminal 100, a transmission network medium 200, and a streaming media server 300, wherein, the streaming media server 300 mainly comprises a polling pool 310 and a communication adaptation module 320. The communication adaptation module comprises a task polling module 321, a transmission processing module 322, a receipt processing module 323, a self-loop activation module 324, and a link initialization module 325.

The transmission medium composed of TCP/IP protocol is used to implement the interaction of data message between the terminal and the streaming media server, and the task polling module is used to transmit and receive the practical data messages, and when there is a data message sent from the terminal, the task polling module detects the message and generates a readable event, and the receipt processing module responds to the readable event and reads and analyzes the data message; when the upper layer application needs to send a data message to the terminal, the transmission processing module packages the data message and writes the content of data message into the sending buffer, and generates a writable event, and the task polling module responds to the writable event and executes the practical sending tasks. The link initialization module is used to initialize the system resource and setting parameters used by each module. The self-loop activation module is used to activate and wake the task polling module and trigger the polling task to perform the message polling function.

Said link initialization module mainly implements the following functions:

declare the polling pool used for TCP communication, and the size of the polling pool is designed according to the maximum number of links;

declare the registration event used for the link of TCP communication;

declare the buffers used for processing the link polling event;

generate a management socket file descriptor for processing, accepting and managing the TCP connection;

create a service end socket for TCP intercepting;

set a file descriptor related to the event to be processed by the polling task according to the calling interface provided by the operating system, and the relationship between the file descriptor and the above file descriptor is managing and managed; the file descriptor which is put into the polling list is the intercepting socket file descriptor and the newly-established (STB) link socket file descriptor;

set the type of the event to be processed by the polling task according to the calling interface provided by the system;

add the intercepting socket into the polling task;

There are three kinds of registration events saved in said polling poll in the following:

1) Intercepting event, which is used to establish the event of connection between the terminal and the streaming media server;

2) Readable event, which is an event used to receive data in the link;

3) Writable event, which is an event used to transmit data in the link.

When the polling task detects that the current event to be processed in the polling pool is an intercepting event, accept the connection request, and record the socket file descriptor used for the STB connection, and establish a link index especially for this STB in the polling list.

When the polling task detects that the current event to be processed in the polling pool is a readable event, check whether the buffer receiving data is normal or not, and then notify the receipt processing module to receive the data.

When the polling task detects that the event to be processed in the polling pool is a writable event, the task polling module reads data from the data sending buffer and performs the transmission of the practical data message.

After said task polling module starts up the polling task, the polling task waits for event happening in the polling pool, and performs different procedures according to the type of events. The polling task needs to call the event polling interface provided by the system to poll the events in the established link, since the general SELECT event polling interface has relatively low efficiency in event polling when there is a terminal with a large amount of data accessing, an embodiment of the present invention uses an event polling interface in an embedded system (such as Linux) to replace the general SELECT interface, and the interface is called EPOLL/POLL interface which returns the number of STBs, that is, return the set of all STB connections in the management socket file descriptor, thus each socket can be processed individually, therefore the interface can support the access of a large number of terminals very well and has a higher execution efficiency than the SELECT interface.

For the parallel connection of a large number of terminals (such as STBs), in order to further improve the processing efficiency, an embodiment of the present invention uses the polling list in the polling pool to save the online links, and the embodiment of the present invention uses the socket file descriptor of the newly established link as the index entry in the polling list, and using the socket file descriptor as the index is one-time index mechanism which can improve the searching efficiency.

According to a link signal sent from the upper layer application, said transmission processing module finds a designated link, and searches the sending message queue head of the link, and if the queue head message is null, put the new message to be sent into the head of the queue. Otherwise, if there has been a message to be sent in the message queue, the transmission processing module copies the new message to be sent into the message buffer, and increases the message pointer in the message buffer with one. If the buffer is full, then the transmission processing module reports an alarm to inform that the queue overflows. After the message is put into the queue, the transmission processing module sets a file descriptor for the write operation, and sets a writable event in the polling poll, and the writable event is used to trigger the polling task to check the sending queue, and the practical message transmission is implemented by the polling task.

According to the notification from the task polling module, said receipt processing module receives the data sent by the terminal from the link data receiving buffer, and after said receipt processing module receives the RTSP protocol data message sent by the terminal, it analyzes the input byte stream to check whether there is a session description protocol (SDP) part or not, and analyzes the SDP part to get the length of SDP section if there is a SDP section, and if the received SDP part is not long enough, buffers the data received this time and continues receiving next time. If the SDP is long enough, the receipt processing module sends it to the RTSP protocol processing module in the streaming media server to continue with the RTSP protocol analysis. The rule to detect the SDP is: SDPKey=="Content-length:" and SDPKey1=="Content-length:". When analyzing the input byte flow, it needs to judge whether the separator "/r/n/r/n" has been segmented or not. If there is no SDP part, then receiving and analyzing the data according to "/r/n" rule would be fine. SDP part is generated by the server for describing information such as the encoding information of a media file and the link in said server, and the STB uses the SDP to configure the settings of the playing software, and the SDP is a simple text protocol with extendable grammar.

The self-loop activation module creates an automatic activation socket in the streaming media server, and when there is no event happening in the polling pool, this module sends the activation message through the internal loopback address to trigger the polling task to perform the message polling function. The automatic activation socket refers to the socket creating the loopback address (LocalHost) in a single board, and the socket is used regularly to send message, and the polling task is used to check regularly whether this socket has a message arriving or not.

Figure 3:
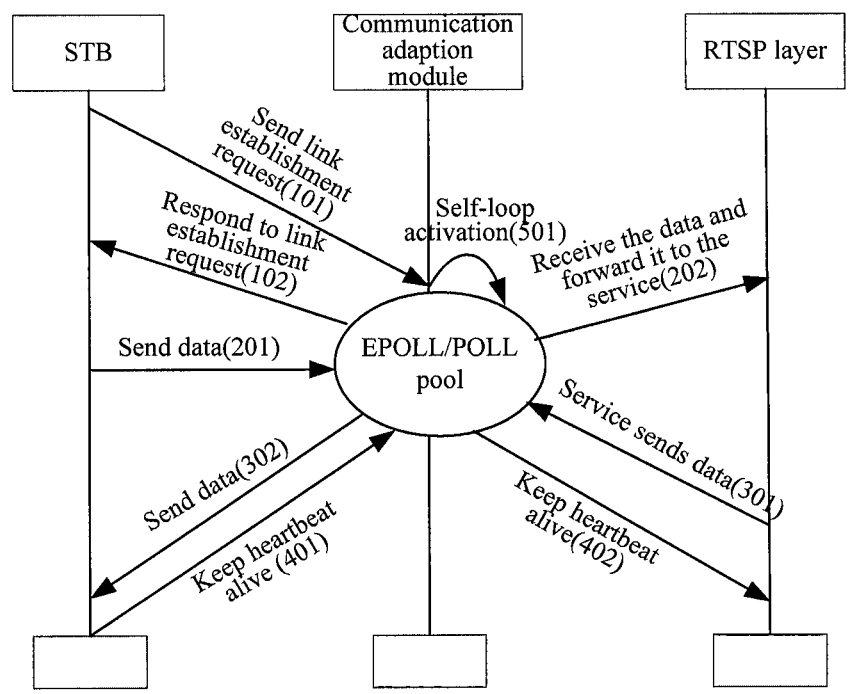
FIG. 3 is a flow chart of processing messages in accordance with the method of an embodiment of the present invention.

FIG. 3 is a flow chart of processing messages in accordance with said method of an embodiment of the present invention, and the procedure of the message interaction is as follows:

Step 101: the terminal (STB) sends a registration request to the streaming media server, and initiates a link establishment request in the TCP/IP layer, and after detecting the request, the task polling module in the communication adaptation module sets an intercepting event, and responds to the intercepting event, and after the registration process is analyzed, the procedure proceeds to step 102; in this step, the task polling module uses the EPOLL/POLL event polling interface to poll the events.

Step 102: according to different port number of the terminal, the task polling module assigns a short connection and organizes the link data buffers, and adds the newly assigned short connection to the polling list in which the socket file descriptor is used as the index entry, and then the RTSP protocol layer authenticates the terminal and returns a registration passed response message to the STB terminal after the authentication is passed. Firstly, the transmission processing module adds a writable event in the polling pool, and after the task polling module detects the writable event, it sends the registration passed response message to the terminal through the link, and the terminal acknowledges that it receives the response, when it means that a normal communication link is established between the terminal and the streaming media server, and the procedure proceeds to step 201.

Step 201: after a normal communication link is established, the terminal sends a service data message such as DESCRIBE message to acquire the description information of the media stream.

Step 202: after the task polling module detects that there is a readable event in the link, it notifies the receipt processing module to receive and analyze the data, and the processed data is forwarded to the RTSP protocol layer which returns the data OK message, and then proceed to step 301.

Step 301: after the terminal receives the response OK, the process of step 201 is repeated generally, except that the message is changed to SETUP message that is used to send parameters, such as establishing a media connection and assigning a transmission mode. The RTSP protocol layer returns a data OK message, and then the procedure proceeds to step 302.

Step 302: the task polling module detects a writable event, and searches the sending queue, and forwards the data message to the terminal after reading the data message from the buffer.

In normal service procedure, the streaming media server also sends the PLAY message to perform some service operations such as on-demand, live, time shift, and fast forward and fast backward. TEARDOWN is sent at last to end the session this time. The process of steps 201 to 302 is repeated.

Steps 401-402: the terminal sends the heartbeat keep-alive message (OPTIONS message) at an interval of 30-50 s to maintain a connection with the streaming media server which may perform a disconnection actively if not receiving the heartbeat keep-alive message from the STB in N minutes.

Step 501: the process is mainly responsible for implementing the self-healing activation function of the polling task, which is implemented by the self-loop activation module to prevent abnormal communication tasks and avoid excessive time delay of the message in the link queue.

To sum up, the present invention can be applied to the system of the streaming media server accepting the access of the STBs in the IPTV system, and it greatly helps to solve the problem of the terminal concurrent connection in the IPTV system and to improve the communication efficiency. The above description is only a preferred embodiment rather than the restriction of the protection scope of the present invention.

INDUSTRIAL APPLICABILITY

The technical scheme of an embodiment of the present invention uses the improved event polling interface to guarantee the maximum number of concurrent video streams of the streaming media server and to support the access of a large number of terminals by TCP short connections at the same time. Since the link searching method of directly indexing is used when creating a link, the efficiency of communication processing can be significantly improved. The technical scheme of the present invention can be flexibly applied into environments, such as the streaming media server communication system in the IPTV, in which there are a large number of STBs accessing.

What is claimed is:

1. A streaming media server comprising at least one processor executing a link initialization module, a task polling module, a transmission processing module, and a receipt processing module, wherein,
    said link initialization module is configured to implement an initialization operation, wherein the initialization operation comprises setting a maximum count of file handles allowed to be opened;
    said task polling module is configured to be responsible for establishing and intercepting a link and polling events in the link; to receive a message sent by a terminal when the terminal sends the message to the streaming media server, and notify said receiving and processing module to process the received message; to read from the transmission processing module message data organized by the transmission processing module when the streaming media server needs to send a message to the terminal, and to send the message data;
    said transmission processing module is configured to process the message data sent from an upper layer application and notify the task polling module to send the processed message data;
    said receiving and processing module is configured to read the received message data from the task polling module, and to process the read message data and send the processed message data to the upper layer application.

2. The streaming media server of claim 1, wherein, said task polling module is configured to use an EPOLL/POLL event polling interface to poll events in an established link.

3. A system for implementing access of a large number of terminals to a streaming media server, and said system comprising said streaming media server of claim 2.

4. The streaming media server of claim 1, wherein, said task polling module comprises a polling list which is used to save links, and said polling list uses a socket file descriptor as an index entry.

5. A system for implementing access of a large number of terminals to a streaming media server, and said system comprising said streaming media server of claim 4.

6. The streaming media server of claim 1, wherein, said streaming media server further comprises a self-loop activation module, and said self-loop activation module is configured to wake and activate a polling task.

7. A system for implementing access of a large number of terminals to a streaming media server, and said system comprising said streaming media server of claim 6.

8. A system for implementing access of a large number of terminals to a streaming media server, and said system comprising said streaming media server of claim 1.

9. A method for implementing access of a large number of terminals to a streaming media server, said method comprising the following steps of:

A: when the streaming media server receives a link request from a terminal, a polling task responding and processing the request, and adding a newly-established link into a polling pool;

B. the polling task polling the polling pool, and when there is message data sent from the terminal, the polling task receiving said message data and setting a readable event, and a receiving and processing module responding to said readable event, and analyzing said message data, and then forwarding the message data to an upper layer application; and C. after packaging the message data sent to the terminal by the upper layer application, the transmission processing module writing the message data into a sending queue, and setting a writable event, and after detecting that there is said writable event, the polling task acquiring the to-be-sent message data from the sending queue and sending the acquired and to-be-sent message data to the terminal;

before said step A, said method also comprising: initializing a system, the step of initializing the system comprising setting a maximum count of file handles allowed to be opened.

10. The method of claim 9, wherein, the step of said polling task polling said polling pool in the step B is implemented by using an EPOLL/POLL event polling interface.

11. The method of claim 9, wherein, after the step of the polling task adding the newly-established link into the polling pool in said step A, the method further comprises: said polling poll using a polling list to save online links and using a socket file descriptor as an index entry of said polling list.

12. The method of claim 9, wherein said streaming media server utilizes a dynamic link library interface provided by an operating system to set the maximum count of file handles allowed to be opened.

13. The method of claim 9, said method also comprising the following steps of: the terminal sending a heartbeat keep-alive message to the upper layer application of the streaming media server periodically, and the streaming media server performing timing detection of the heartbeat keep-alive message to check whether a message channel between the terminal and the upper layer application of said streaming media server is in activated state or not.

14. The method of claim 9, said method also comprising the following step of:

creating an automatic activation socket in the streaming media server, and when there is no event happening in the polling pool, sending an activation message through an internal loopback address to trigger the polling task to perform a message polling function.

* * * * *